US012323381B2

(12) United States Patent
Kikas et al.

(10) Patent No.: US 12,323,381 B2
(45) Date of Patent: Jun. 3, 2025

(54) OPTIMIZED MESSAGE ROUTING BY COMMUNICATION SERVICES PLATFORM

(71) Applicant: Twilio Inc., San Francisco, CA (US)

(72) Inventors: Riivo Kikas, Tallinn (EE); Oleksandr Drozd, Tallinn (EE); Nariman Nazari, Malmo (SE); Ilja Samoilov, Tallinn (EE)

(73) Assignee: Twilio Inc., San Francisco, CA (US)

( * ) Notice: Subject to any disclaimer, the term of this patent is extended or adjusted under 35 U.S.C. 154(b) by 79 days.

(21) Appl. No.: 18/242,913

(22) Filed: Sep. 6, 2023

(65) Prior Publication Data
US 2025/0080489 A1    Mar. 6, 2025

(51) Int. Cl.
| | |
|---|---|
| *H04L 12/851* | (2013.01) |
| *H04L 29/06* | (2006.01) |
| *H04L 29/08* | (2006.01) |
| *H04L 45/00* | (2022.01) |
| *H04L 51/58* | (2022.01) |

(52) U.S. Cl.
CPC .............. *H04L 51/58* (2022.05); *H04L 45/14* (2013.01)

(58) Field of Classification Search
CPC ....... H04L 51/58; H04L 45/14; H04L 12/851; H04L 29/08; H04L 29/06
USPC ......................................................... 709/206
See application file for complete search history.

(56) References Cited

U.S. PATENT DOCUMENTS

2020/0403925 A1*  12/2020  Bevilacqua ............. H04L 69/16

* cited by examiner

*Primary Examiner* — Jude Jean Gilles
(74) *Attorney, Agent, or Firm* — Lowenstein Sandler LLP

(57) ABSTRACT

An example method of selecting message routing providers based on message delivery data includes: receiving, by a processing device, message delivery data characterizing message delivery by a plurality of message routing providers to a specified destination network; estimating, based on the message delivery data, for each message routing provider of the plurality of message routing providers, corresponding values of one or more parameters of a statistical distribution of message delivery outcomes by a respective message routing provider to the specified destination network; and determining, based the values of the one or more parameters, an allocation of outgoing messages to message routing providers, the allocation not exceeding a specified cost ceiling of message delivery and yielding a maximum value of a chosen message delivery metric for messages originated by a message originating entity that has not provided at least part of the message delivery data.

20 Claims, 7 Drawing Sheets

| Delivered messages | Routed messages | Conversion rate | LCB of successful delivery |
|---|---|---|---|
| 3 | 3 | 1 | 0.2924 |
| 9 | 10 | 0.9 | 0.5550 |
| 18 | 20 | 0.9 | 0.6830 |
| 90 | 100 | 0.9 | 0.8238 |
| 180 | 200 | 0.9 | 0.8498 |
| 900 | 1000 | 0.9 | 0.8797 |
| 1800 | 2000 | 0.9 | 0.8860 |
| 9000 | 10000 | 0.9 | 0.8940 |

FIG. 3

OPTIMIZED MESSAGE ROUTING BY COMMUNICATION SERVICES PLATFORM

TECHNICAL FIELD

Aspects and implementations of the disclosure relate to computer networking, and more specifically, to systems and methods for optimized message routing by a communication services platform.

BACKGROUND

Instant messaging (IM) technology allows real-time transmission of media content over the Internet or another packet switched network. Sender-originated messages may be transmitted to one or more recipients, which may be connected to a destination network via a common application. Short Messaging Service (SMS) technology provides text messaging, i.e., sending an SMS message to one or more mobile client devices over a cellular data network. Multimedia Messaging Service (MMS) technology provides a way to send messages that include multimedia content to one or more mobile client devices over a cellular data network.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

FIG. 3 illustrates an example of computed lower confidence bounds (LCBs) of the likelihood of successful message delivery based on various combinations of the routed messages and successfully delivered messages, in accordance with aspects of the present disclosure.

DETAILED DESCRIPTION

Figure 1:
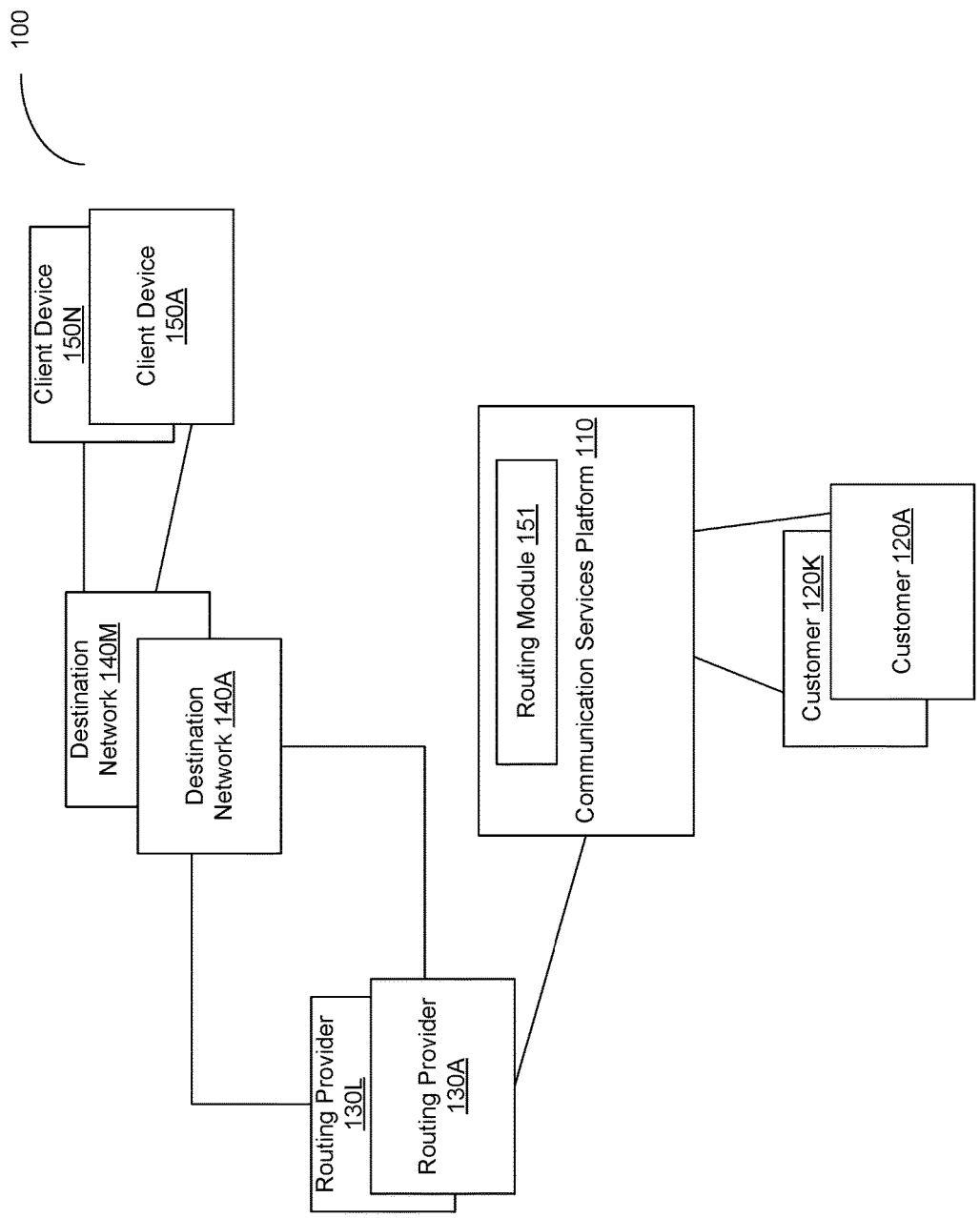
FIG. 1 illustrates an example system architecture of a communication services platform, in accordance with aspects of the disclosure.

Various organizations have been increasingly adopting messaging as a valuable tool for communications within and outside of the organization. In an example use case, an organization may use messaging to forward to client devices of its end users one-time passwords for a two-factor authentication scheme. In another example use case, an organization may use messaging to send promotional messages to client devices of its end users. In yet another example use case, an organization may use messaging to send appointment reminders to client devices of its end users and may further request the message receiver to reply to either confirm or cancel an appointment.

In these and various other use cases, organizations may employ communication services platforms, such as Software as a Service (SaaS) platforms, which facilitate sending of messages (such as SMS messages, MMS messages, and/or IM messages) generated by multiple message originating entities ("customers" of the communication services platform) to recipient devices via multiple message routing providers.

Message routing providers that are utilized by a given communication services platform may employ different communication technologies, networks, and/or configurations, which may result in different values of one or more chosen quality and/or performance metrics that are measurable by the communication services platform. In an illustrative example, a message delivery metric may reflect an estimated likelihood of successful message delivery to the intended recipients.

Furthermore, each message routing provider may have its own pricing model, which may be, e.g., a fixed price for routing a specified number of messages, volume-dependent price, time-of-day dependent price, and/or various combinations of these and other pricing models. Conversely, each customer of a communication services platform may choose a suitable message routing optimization objective (e.g., not to exceed a predefined per-message cost).

In order to meet the customers' message routing optimization objectives, the communication services platform may dynamically allocate customer-originating messages to the available message routing providers serving a specified destination network (which may be identifier, e.g., by the Mobile Country Code (MCC) and/or Mobile Network Code (MNC)). In some implementations, the communication services platform may utilize customer-provided message delivery feedback in order to estimate values of one or more parameters of a statistical distribution of message delivery outcomes by each message routing provider.

However, some customers may provide delayed message delivery feedback, aggregated message delivery feedback, or no message delivery feedback at all, thus preventing the communication services platform from basing the message routing decisions for messages originated by a particular customer on the feedback provided by that customer.

Aspects of the present disclosure address the above-mentioned and other challenges by allocating the outgoing messages to message routing providers based on the message delivery feedback provided by multiple message-originating entities (e.g., customers of the communication services platform), while optimizing one or more chosen message delivery metrics (e.g., reflecting the likelihood of successful message delivery to the intended recipients) under a specified cost ceiling of message delivery. Thus, the message delivery data reported by multiple customers may be aggregated and utilized for making routing decisions not only for the feedback providing customers but also for no-feedback customers.

"Cost" herein shall broadly refer to an amount of resources that are consumed by the message delivery. In an illustrative example, the cost of message delivery may be measured by a monetary amount charged for the message delivery by the message routing provider. In an illustrative example, the cost of message delivery may reflect (i.e., may be derived by applying a chosen mathematical transformation to) the amount of computing resources (e.g., memory size, processing power, number of virtual machines, etc.) that are consumed by the message delivery. In other illustrative examples, the cost of message delivery may reflect the above-described and various other metrics.

Each of the customers of the communication services platform may have its own traffic optimization objective expressed by a corresponding set of requirements (e.g., a specified average per-message cost ceiling). Accordingly, the communication services platform may distribute the customer-originated messages among the message routing providers in order to satisfy the customer-specific traffic optimization objective. The message delivery feedback reported by multiple feedback-providing customers may be pooled together and utilized for estimating values of one or more parameters of a statistical distribution of message delivery outcomes by each message routing provider. The estimated parameter values may then be used for routing decisions for message delivery feedback-providing customers and/or no-feedback customers.

In an illustrative example, a communication services platform receives, from multiple feedback-providing customers, message delivery data reflecting message delivery outcomes by a pool of message routing providers to the specified destination network. The message delivery data supplied by each feedback-providing customer may include, for each provider employed for delivering messages to a specified destination network, the provider identifier, the routed message count (e.g., the number of messages that had been routed by the provider within a specified time window), and the feedback count (e.g., the number of messages for which the successful delivery to the specified destination network was confirm by the recipient).

The message delivery data received from multiple message originating entities (e.g., customers of the communication services platform) may be aggregated by the communication services platform. Accordingly, the aggregated message delivery data for a specified destination network may include, for every message routing provider, the total routed message count, and the total feedback count (for messages originated by all customers).

Based on the aggregated message delivery data, the communication services platform may estimate values of one or more parameters of a statistical distribution of message delivery outcomes by each message routing provider. In some implementations, the statistical distribution is assumed to be binomial, and the parameters of the statistical distribution represent the lower bound and/or the upper bound of the confidence interval of the likelihood of successful message delivery, as explained in more detail herein below.

In some implementations, in order to detect and react to abruptly changing values of the chosen message delivery metric (e.g., the message conversion rate reflecting the likelihood of successful message delivery), the communication services platform may maintain provider-specific sliding windows, such that each sliding window would include a predefined amount of time and/or a predefined number of messages. A message conversion rate for a specific message routing provider may be represented by the share of the messages transmitted by that message routing provider that were successfully delivered to respective client devices (i.e., the ratio of the number of delivered messages to the number of forwarded messages by the message routing provider).

Responsive to detecting a significant difference between the values of the chosen message delivery metric in the current and previous sliding windows of a certain message routing provider, the communication services platform may reset the message delivery counters before proceeding to re-compute the values of one or more parameters of a statistical distribution of message delivery outcomes by each message routing provider, as described in more detail herein below.

The computed values of the parameters of the statistical distribution of message delivery outcomes by each message routing provider are then fed to one or more routing models, which distribute the customer-originated messages among the message routing providers in order to satisfy the customer-specific traffic optimization objective, as described in more detail herein below.

Thus, the present disclosure addresses the technical problem of message routing under specified constraints. A technical solution to the above-identified technical problem involves using the message delivery feedback for estimating values of one or more parameters of the statistical distribution of message delivery outcomes by each message routing provider, which are then used for allocating message traffic to message routing providers.

Another technical solution to the above-identified technical problem involves detecting and reacting to abruptly changing provider-specific values of a chosen message delivery metric by monitoring resetting the message delivery counters responsive to detecting a significant difference between the values of the chosen message delivery metric in the current and previous sliding windows.

Thus, the technical effect includes utilizing message delivery data reported by multiple customers for making routing decisions for the feedback providing customers and/or for no-feedback customers, thus increasing the accuracy of estimating the values of the parameters of the statistical distribution of message delivery outcomes by each message routing provider. Furthermore, abrupt changes in per-provider values of the chosen message delivery metric may be detected faster due to the larger available data set. Finally, the provider exploration costs and associated performance sacrifices may be shared between multiple customers. "Provider exploration" herein refers to a technique involving routing a certain number of messages to one or more suboptimal providers, in order to collect message delivery data that is sufficient for estimating the values of the parameters of the statistical distribution of message delivery outcomes by each message routing provider, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

FIG. 1 illustrates an example distributed system architecture ("system") 100 implemented in accordance with aspects of the present disclosure. The distributed system architecture 100 supports a communication services platform 110, which may be implemented by one or more general purpose or specialized computing devices (such as servers), data stores (e.g., hard disks, memories, databases), networks, other hardware components that are utilized to run one or more software services, such as message routing services, and various middleware and operating systems. The computing devices may be disposed in one or more physical locations, which may include geographically distributed physical locations.

In some implementations, communication services platform 110 may implement a Software as a Service (SaaS) platform that provides messaging services for forwarding messages (such as SMS messages, MMS messages, and/or IM messages) generated by multiple message-originating entities (e.g., customers 120A-120K of the communication services platform) to client devices 150A-150N via a pool of message routing providers 130A-130L serving respective destination networks 140A-140M. In some implementations, the communication services platform 110 may further provide various other services, including voice services, electronic mail services, video services, and/or chat messaging services.

The communication services platform 110 may be accessed (e.g., via one or more application programming interface (API) endpoints) by customer computing devices 120A-120K via a communication network, which can include one or more public networks (e.g., the Internet) and/or private networks (e.g., a local area network (LAN) or wide area network (WAN)) utilizing various physical and datalink layer technologies, such as wired networks (e.g., Ethernet network), wireless networks (e.g., an 802.11 network or a Wi-Fi network), and/or cellular networks (e.g., a Long Term Evolution (LTE) network).

A customer computing device 120A-120K may be represented by a general purpose or specialized computing device implementing a server running one or more applications that utilize one or more messaging technologies (such as Short Message Service (SMS) or Multimedia Messaging Service (MMS)) for communicating with client applications running on client devices 150A-150N.

A client device 150A-150N may be represented by a general purpose or specialized computing device, such as a mobile communication device (e.g., a smartphone), a portable computer (PC), a wearable device (e.g., smart watch, smart glasses, etc.), a network-connected television set, a smart appliance (e.g., a video doorbell), etc. In some implementations, a client device 150 may run one or more client applications that communicate (e.g., using one or more messaging technologies) with one or more customer computing device 120A-120K. In various example use cases, a client application running on a client device 150 may be a web application or a standalone application implementing a graphical user interface (GUI).

In some implementations, an API endpoint exposed by the communication services platform 110 may be accessed via a resource identifier, such a universal resource identifier (URI). The API endpoint may receive requests and return responses from/to customers 120A-120K. In various implementations, the API endpoint may implement, e.g., a REST (Representational State Transfer) API, a GraphQL API, a SOAP (Simple Object Access Protocol) API accessible via HTTP (Hypertext Transfer Protocol)/HTTPS (Hypertext Transfer Protocol Secure) or other suitable application layer protocols.

In some implementations, the API endpoint may be used for initiating a messaging request that may include one or more destination identifiers (e.g., recipient phone numbers), the message content (e.g., text and/or multimedia content), and the origin identifier (e.g., a sender phone number). In some implementations, outgoing messages may be automatically assigned an origin identified that is associated with the customer account.

Message routing providers 130A-130L that are utilized by a given communication services platform may employ different communication technologies, networks, and/or configurations. In an illustrative example, each message routing provider 130 may route the incoming messages to specified destinations via one or more messaging gateways (e.g., SMS gateways). Accordingly, message routing providers 130A-130L may exhibit different values of one or more chosen quality and/or performance metrics. In an illustrative example, a performance metric may reflect an estimated likelihood of successful message delivery to the intended recipients. Furthermore, each message routing provider 130A-130L may have its own pricing model, which may be, e.g., a fixed price for routing a specified number of messages, volume-dependent price, time-of-day dependent price, and/or various combinations of these and other pricing models.

Conversely, each customer 120A-120K of the communication services platform 110 may choose its own traffic optimization objective, which may be expressed by a set of requirements, e.g., specifying the desired value of a chosen message routing metric and/or desired cost. In an illustrative example, the set of requirements may prescribe maximizing the likelihood of successful message delivery (e.g., characterized by the message conversion rate) while not exceeding a specified maximum cost.

In order to meet the customer requirements, the communication services platform 110 may dynamically allocate customer-originating messages to the available message routing providers for a specified destination network (e.g., identified by the Mobile Country Code (MCC) and/or Mobile Network Code (MNC)). The destination network identifier(s) may be derived from the destination phone number or other destination endpoint identifier.

In an illustrative example, the communication services platform 110 may identify, in an MCC/MNC directory, a record mapping at least a part of the destination phone number to the corresponding destination network (identified by the MCC and/or MNC). Then, the communication services platform 110 may select, from the pool of available message routing providers, a subset of message routing providers 130A-130L that serve the identified destination network.

In an illustrative example, the communication services platform 110 may utilize the message delivery feedback provided by one or more platform customers in order to estimate one or more parameters of a statistical distribution of message delivery outcomes by each message routing provider. In some implementations, the statistical distribution is assumed to be binomial, and the parameters of the statistical distribution represent the lower bound and/or the upper bound of the confidence interval of the likelihood of successful message delivery.

The routing decisions may be made by the message routing module 151 of the communication services platform 110 by feeding the computed values of the parameters of a statistical distribution of message delivery outcomes to one or more routing models, which may distribute the customer-originated messages among the message routing providers in order to satisfy the customer-specific traffic optimization objective. Thus, the message delivery feedback reported by multiple feedback-providing customers is pooled together and utilized for estimating values of one or more parameters of a statistical distribution of message delivery outcomes by each message routing provider, which then are used for routing decisions for message delivery feedback-providing customers and/or no-feedback customers, as described in more detail herein below.

In situations in which the systems discussed here collect personal information about users, or may make use of personal information, the users may be provided with an opportunity to control whether the communication services platform 110 collects user information, or to control whether and/or how to receive content from the communication services platform 110 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the communication services platform 110.

Elements of FIG. 1 are used with respect to FIGS. 2-6 to help describe various aspects and features of the communication services platform 110.

Figure 2:
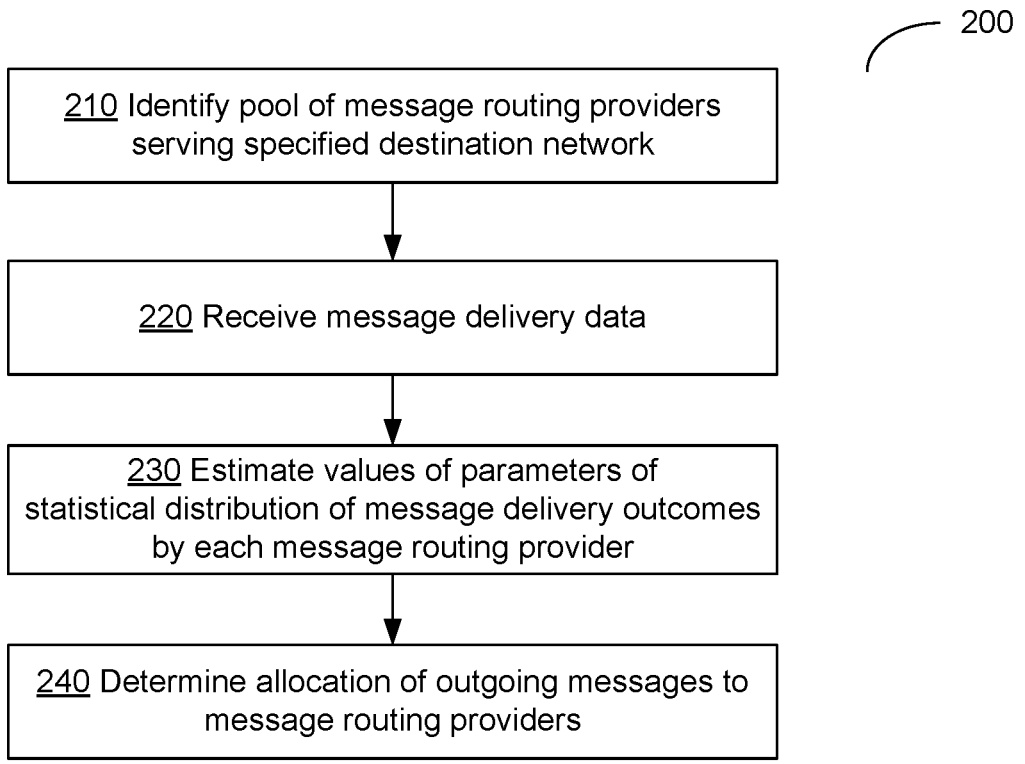
FIG. 2 is a flow diagram of an example method of determining the allocation of messages to message routing providers, such that the allocation would yield the maximum value of a chosen message delivery metric under the specified cost ceiling of message delivery, based on message delivery data reported by multiple message originating entities, in accordance with aspects of the present disclosure.

FIG. 2 is a flow diagram of an example method 200 of determining the allocation of messages to message routing providers, such that the allocation would yield the maximum value of a chosen message delivery metric under the specified cost ceiling of message delivery, based on message delivery data reported by multiple message originating entities, in accordance with aspects of the present disclosure. The method 200 can be performed for each destination network that is served by the communication services platform. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 210, the processing logic implementing the method identifies a pool of message routing providers serving a specified destination network, as described in more detail herein above.

At operation 220, the processing logic receives the aggregated message delivery data reflecting message delivery by the pool of message routing providers to the specified destination network. The aggregated message delivery data may include, for each message routing provider that has been employed by the communication services platform to route messages to the specified destination network, the number of messages routed and the number of messages successfully delivered within a specified window, which may be defined by a time period and/or the number of messages. The aggregated message delivery data may be computed by the communication services platform by aggregating the per-customer message delivery data, which may be sent periodically by each customer to the communication services platform.

At operation 230, the processing logic estimates, based on the aggregated message delivery data, values of one or more parameters of a statistical distribution of message delivery outcomes by each message routing provider. In some implementations, the statistical distribution is assumed to be binomial. The chosen parameters of the statistical distribution represent the lower bound and/or the upper bound of the confidence interval of the likelihood of successful message delivery.

In an illustrative example, the lower confidence bound (LCB) of the likelihood of successful message delivery may be represented by the lower bound of a binomial proportion confidence interval (e.g., the Wilson score interval):

$$LCB = \max\left\{0, \frac{2np + z^2 - \left[z\sqrt{z^2 - \frac{1}{n} + 4np(1-p) + (4p-2)} + 1\right]}{2(n + z^2)}\right\}$$

where n is the number of messages routed by the message routing provider,
p is the ratio of the number of messages that have been successfully delivered to the number of messages routed by the message routing provider, and
z reflects the target error rate.

In another illustrative example, the upper confidence bound (UCB) of the likelihood of successful message delivery may be represented by the upper bound of a binomial proportion confidence interval (e.g., the Wilson score interval):

$$UCB = \min\left\{1, \frac{2np + z^2 + \left[z\sqrt{z^2 - \frac{1}{n} + 4np(1-p) - (4p-2)} + 1\right]}{2(n + z^2)}\right\}$$

As seen from the above equations, the computed LCB and UCB of the likelihood of successful message delivery does not depend upon the other performance parameters (including the message delivery volumes) of other message routing providers, but only reflects the message delivery by the chosen message routing provider.

Furthermore, the LCB of the likelihood of successful message delivery depends upon the number of messages transmitted by the message routing provider, thus reflecting the assumption that lower numbers of routed messages should yield lower confidence of the likelihood of successful message delivery, and vice versa.

Furthermore, as schematically FIG. 3, which illustrates an example table 300 of computed LCBs of the likelihood of successful message delivery based on various combinations of the routed messages and successfully delivered messages, the LCB is always less than the corresponding ratio of the number of messages that have been successfully delivered to the number of messages routed by the message routing provider, the difference decreasing and asymptotically approaching zero with the increasing number of routed messages.

In other implementations, various other statistical distribution types and/or parameters may be utilized for determining the allocation of outgoing messages to the message routing providers.

Referring again to FIG. 2, at operation 240, the processing logic determines, based on the estimated values of the parameters of the statistical distribution of message delivery outcomes by each message routing provider, the allocation of outgoing messages to the message routing providers, such that the allocation would yield the maximum value of a chosen message delivery metric (e.g., the message conversion rate) under the specified cost ceiling of message delivery.

In an illustrative example, the distribution of messages is described by a vector of provider weights $w_i$, i=1, ... k, such that the sum of all weights is 1, and each weight represents the share of messages to be routed by the corresponding provider.

The vector of weights may be determined by solving the following optimization task:

Maximize, across all message routing providers for a specified destination network, the sum of the respective message conversion rates ($CR_i$) multiplied by respective provider weights: $\Sigma_{i=1}^{k} CR_i w_i$ under the following constraints:

(1) The sum, across all message routing providers for the specified destination network, of the respective message delivery costs ($P_i$) multiplied by respective provider weights should be less then or equal than the specified cost ceiling (T):

$$\sum_{i=1}^{k} P_i w_i < T$$

and (2) The sum of all provider weights is equal to one:

$$\sum_{i=1}^{k} w_i = 1$$

In some implementations, if the optimization task cannot be solved, then the message routing provider with the lowest message delivery cost would route 100% of messages.

Figure 4:
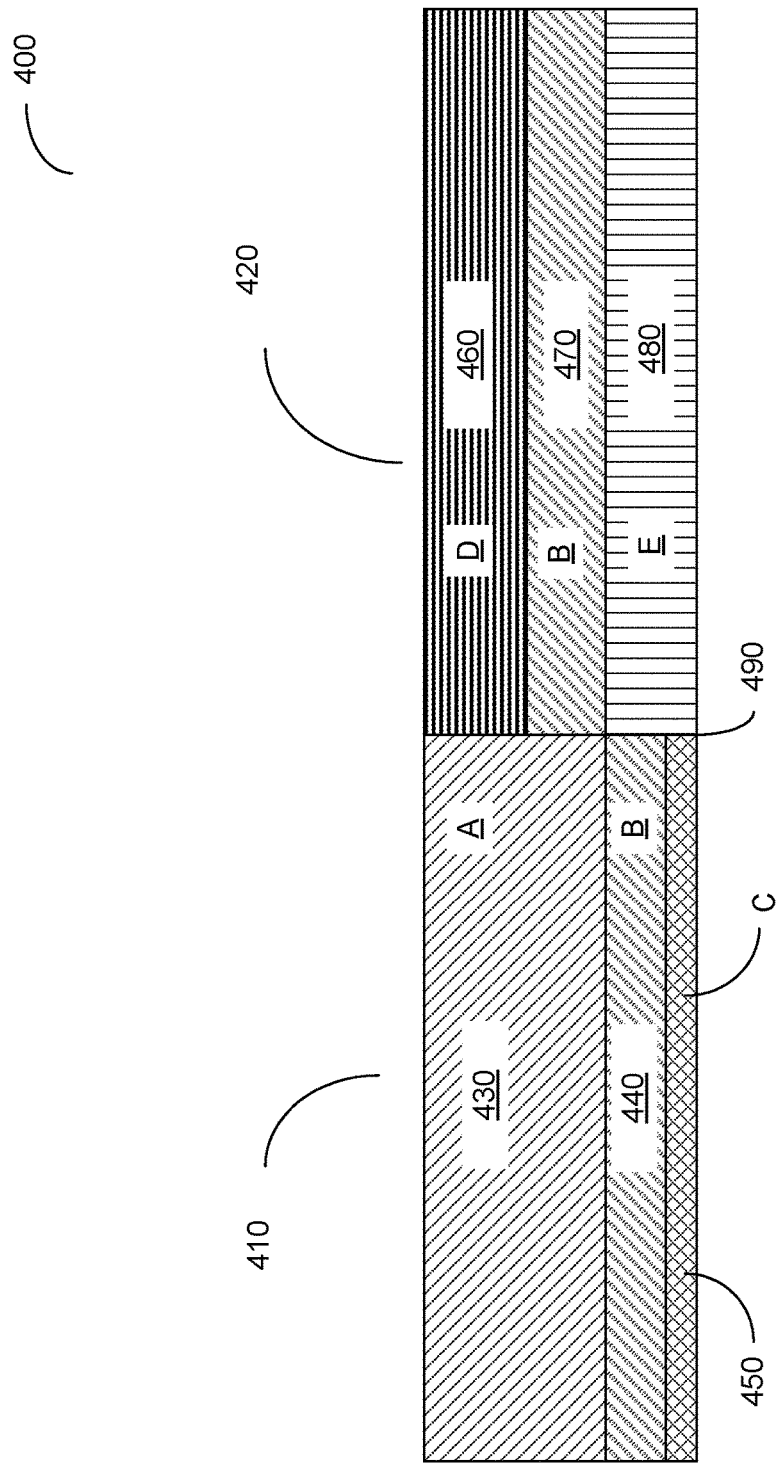
FIG. 4 graphically illustrates an example message routing strategy implemented by the communication services platform operating in accordance with aspects of the present disclosure.

FIG. 4 graphically illustrates an example message routing strategy implemented by the communication services platform operating in accordance with aspects of the present disclosure. In the illustrative example of FIG. 4, the set of customer requirements prescribes maximizing the message conversion rate while not exceeding a specified maximum cost.

Accordingly, during the time period 410, the communication services platform allocates, based on the computed values of one or more parameters of a statistical distribution of message delivery outcomes by each message routing provider, the first portion 430 of messages to message routing provider A, which has the best value of a chosen performance metric (e.g., message conversion rate) and the highest per-message cost; the second portion of messages 440 is allocated to message routing provider B, which has a suboptimal performance metric value but a lower per-message cost, such that the total cost of message delivery for the customer would not exceed the specified maximum cost.

In some implementations, a third portion of messages 450 is allocated to a provider C for exploration, i.e., for determining the provider's value of the performance metric, even if such allocation may produce a slightly suboptimal overall allocation. In order to limit the adverse effect of the exploratory allocation on the resulting routing strategy, the number of messages allocated to a provider for exploration may be limited by a predefined threshold number of share (e.g., 5%) of all messages for a given customer.

As the new message delivery data comes in, the message routing platform, at the time moment 490, detects a significant change in the value of the performance metric of the message routing provider A. "Significant" change herein is defined as a change of the value of the performance metric that exceeds a predefined threshold portion of the value of the performance metric (e.g., 10%) and thus requires updating of the current message routing strategy. An example method of detecting a significant change in the value of the performance metric is described herein below.

Referring again to FIG. 4, during the time period 420, the communication services platform allocates, based on the updated values of the parameters of the statistical distribution of message delivery outcomes by each message routing provider, the first portion 460 of messages to message routing provider D, which now has the best value of the performance metric and the highest per-message cost; the second portion of messages 470 is allocated to message routing provider B, which has a lower value of the performance metric and a lower per-message cost; the third portion of messages 480 is allocated to message routing provider E, which has a lower value of the performance metric and a lower per-message cost, such that the total cost of message delivery for the customer would not exceed the specified maximum cost.

Thus, the message delivery feedback reported by multiple feedback-providing customers is pooled together and utilized for estimating provider-specific message conversion rates, which then are used for routing decisions (e.g., by method 200) for message delivery feedback-providing customers and/or no-feedback customers.

Figure 5:
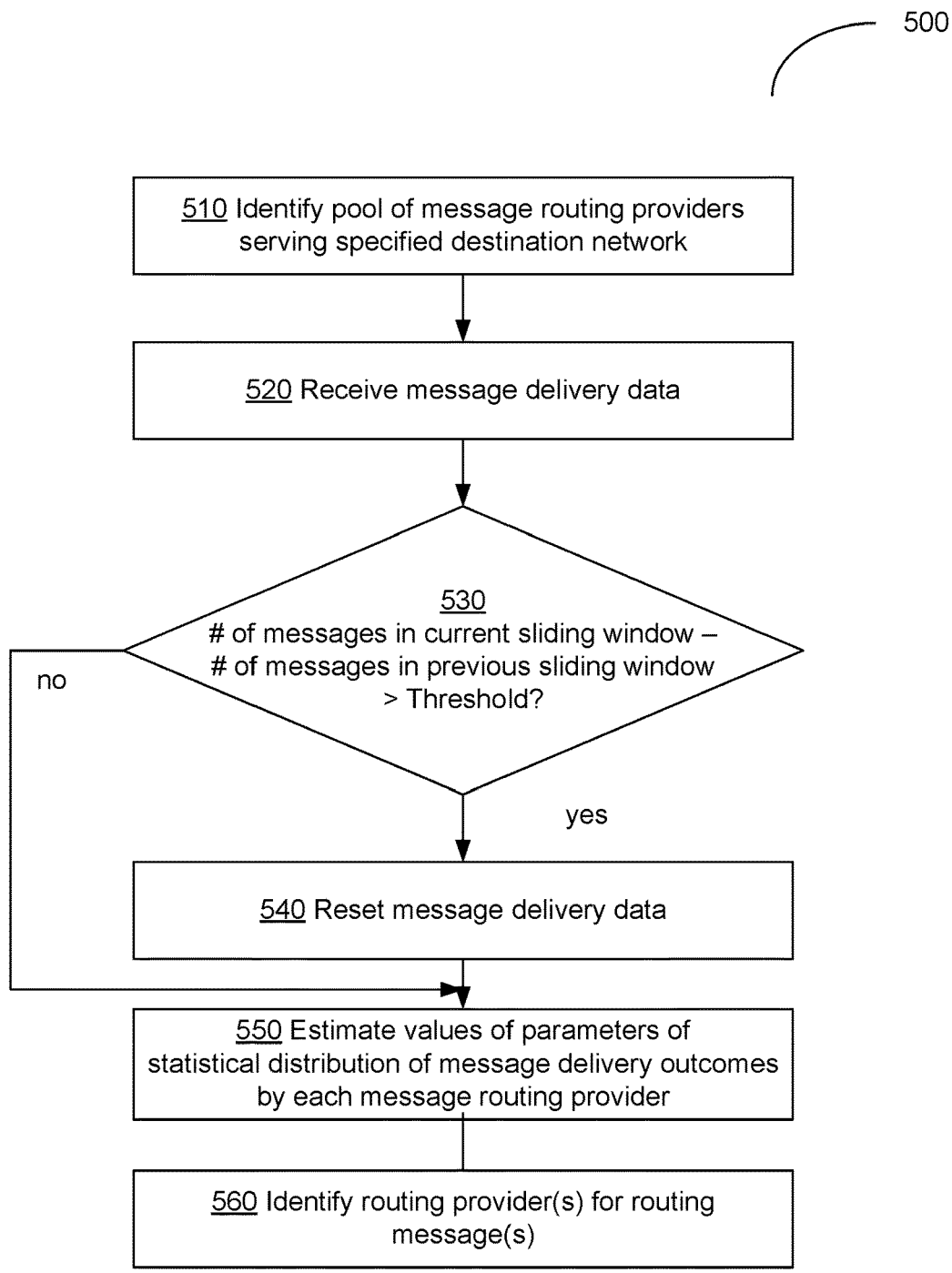
FIG. 5 is a flow diagram of an example method 500 of detecting statistically significant changes in per-provider values of a chosen message delivery metric based on message delivery data reported by multiple customers, in accordance with aspects of the present disclosure.

FIG. 5 is a flow diagram of an example method 500 of detecting statistically significant changes in per-provider values of a chosen performance metric (e.g., message conversion rate) based on message delivery data reported by multiple customers, in accordance with aspects of the present disclosure. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 510, the processing logic implementing the method identifies a pool of message routing providers associated with a specified destination network, as described in more detail herein above.

At operation 520, the processing logic receives, from multiple message-originating entities (e.g., customers of the communication services platform) message delivery data reflecting message delivery by the pool of message routing providers to the specified destination network. The message delivery data provided to the communication services platform by each customer includes, for each message routing provider that has been employed to route the customer's messages, the number of routed messages and the number of messages successfully delivered. The message delivery data may be sent periodically by each customer to the communication services platform, such that the communication services platform may maintain the cumulative total numbers of messages routed and successfully delivered by each provider for each customer.

At operation 530 the processing logic compares the number of messages successfully routed by a certain message routing provider in the previous sliding window and the number of messages successfully routed by the certain message routing provider in the current sliding window. Each sliding window may be defined by a timeframe during which a chosen message routing provider has routed a predefined number (e.g., 1000) of messages. Accordingly, the short-term sliding window would include the predefined number of messages routed by the chosen message routing provider and would further include all the messages that have been routed by other message routing providers of the pool of message routing providers within a chosen long-term sliding window. Accordingly, for each message routing provider, the communication services platform maintains a corresponding current and previous sliding windows in order to detect significant changes in the values of the chosen message delivery metric (e.g., message conversion rate) for that provider.

Responsive to determining, at operation 530, that the difference between the number of messages successfully routed by a chosen message routing provider in the previous sliding window and the number of messages successfully routed by the certain message routing provider in the current sliding window exceeds a predefined threshold, the processing logic, at operation 540, resets message delivery counters (e.g., message delivery counters of the certain message routing provider or message delivery counters of all message routing providers).

At operation 550, the processing logic estimates, based on the updated message delivery data, for each message routing provider of the plurality of message routing providers, a corresponding updated values of the parameters of the statistical distribution of message delivery outcomes by each message routing provider, as described in more detail herein above.

At operation 560, the processing logic identifies one or more message routing providers for routing one or more messages to the destination network, based on the computed values of the parameters of the statistical distribution of message delivery outcomes computed at operation 550, as described in more detail herein above.

Figure 6:
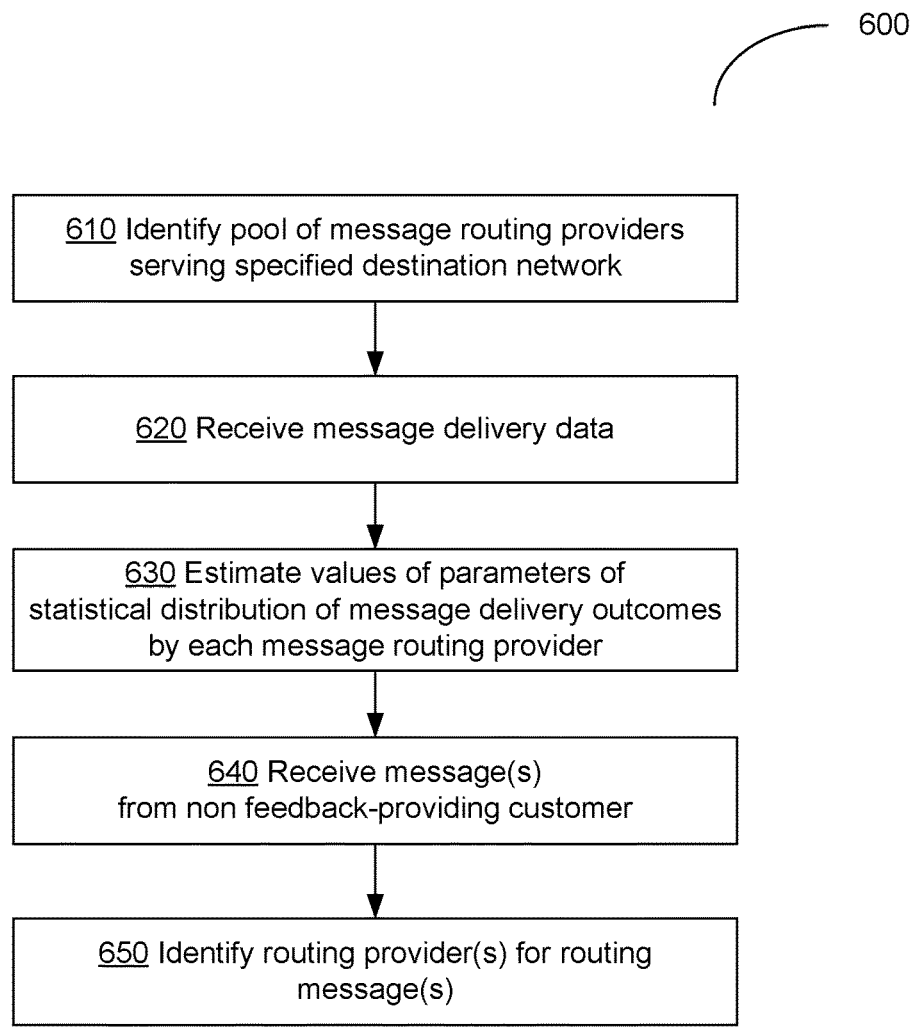
FIG. 6 is a flow diagram of an example method of selecting message routing providers for no-feedback customers based on message delivery data reported by other customers, in accordance with aspects of the present disclosure.

FIG. 6 is a flow diagram of an example method 600 of selecting message routing providers for no-feedback customers based on message delivery data reported by other customers, in accordance with aspects of the present disclosure. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 600 is performed by the one or more modules (e.g., message routing module 151) of the communication services platform 110 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 610, the processing logic implementing the method identifies a pool of message routing providers serving a specified destination network, as described in more detail herein above.

At operation 620, the processing logic receives the aggregated message delivery data reflecting message delivery by the pool of message routing providers to the specified destination network. The aggregated message delivery data may include, for each message routing provider that has been employed by the communication services platform to route messages to the specified destination network, the number of messages routed and the number of messages successfully delivered within a specified window, which may be defined by a time period and/or the number of messages. The aggregated message delivery data may be computed by the communication services platform by aggregating the per-customer message delivery data, which may be sent periodically by each customer to the communication services platform.

At operation 630, the processing logic determines, based on the aggregated message delivery data, estimates values of one or more parameters of a statistical distribution of message delivery outcomes by each message routing provider. In some implementations, the statistical distribution is assumed to be binomial. The chosen parameters of the statistical distribution represent the lower bound and/or the upper bound of the confidence interval of the likelihood of successful message delivery.

At operation 640, the processing logic receives, from a message-originating entity that has not provided at least part of the message delivery data, one or more messages to be forwarded to their respective destinations.

At operation 650, the processing logic identifies, based on the computed values of the parameters of the statistical distribution of message delivery outcomes, the distribution of messages by the message routing providers that would yield the maximum value of a chosen message delivery metric (e.g., message conversion rate) under the specified cost ceiling of message delivery, as described in more detail herein above.

Figure 7:
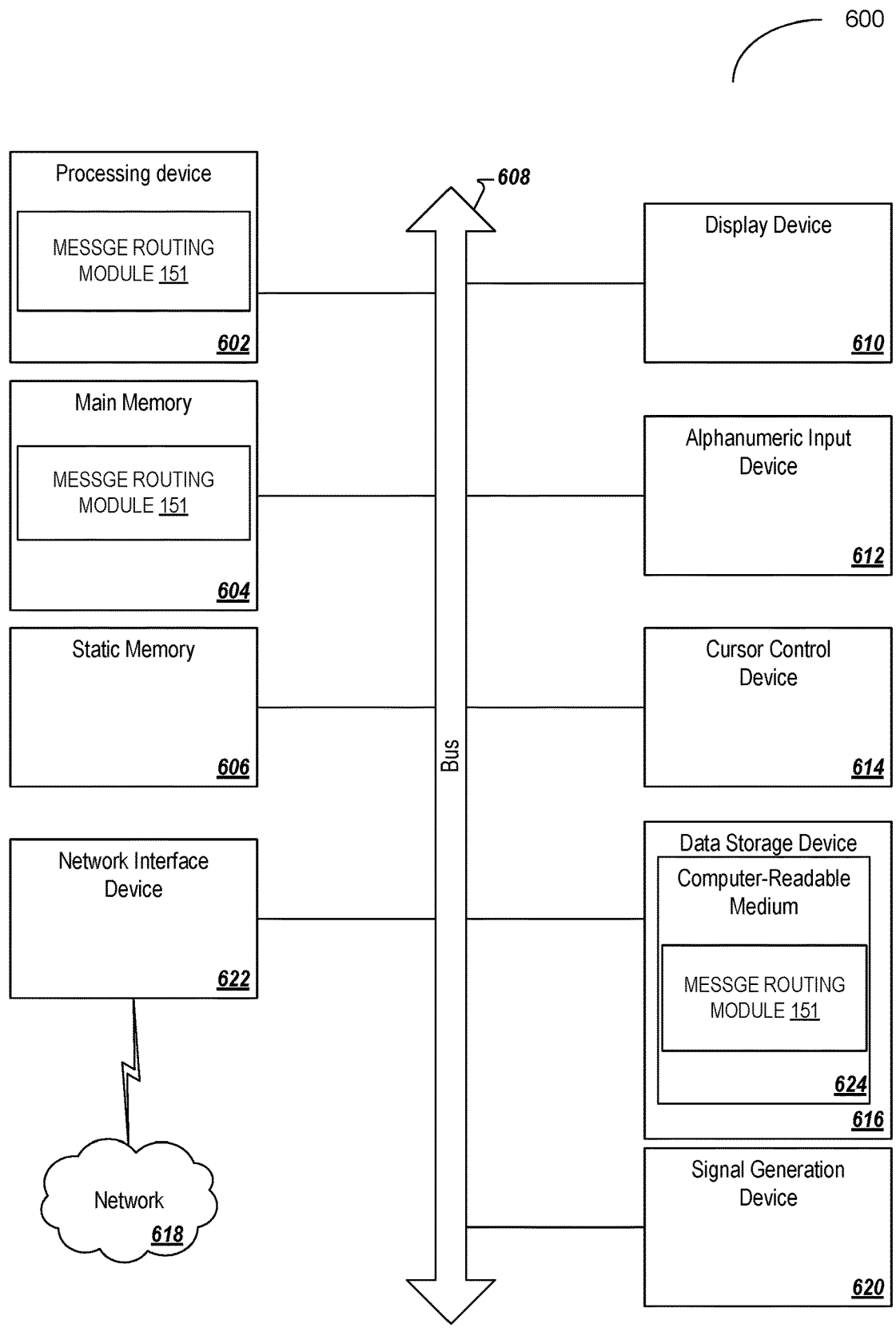
FIG. 7 is a block diagram illustrating an exemplary computer system, in accordance with some implementations of the disclosure.

FIG. 7 is a block diagram illustrating an exemplary computer system 700, in accordance with an implementation of the disclosure. The computer system 700 executes one or more sets of instructions that cause the machine to perform any one or more of the methodologies discussed herein. Set of instructions, instructions, and the like may refer to instructions that, when executed by computer system 700, cause computer system 700 to perform one or more operations of message routing module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 707 (e.g., flash memory, static random access memory (SRAM), etc.), and a data storage device 717, which communicate with each other via a bus 708.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions of the distributed system architecture 100 and the message routing module 151 for performing the operations discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 717 may include a non-transitory computer-readable storage medium 724 on which is stored the sets of instructions of the distributed system architecture 100 of the message routing module 151 implementing the methods described herein. The sets of instructions of the distributed system architecture 100 and of the message routing module 151 may also reside, completely or at least partially, within the main memory 704 and/or within the processing device 702 during execution thereof by the computer system 700, the main memory 704 and the processing device 702 also constituting computer-readable storage media. The sets of instructions may further be transmitted or received over the network 718 via the network interface device 722.

While the example of the computer-readable storage medium 624 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methodologies of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
   receiving, by a processing device, message delivery data characterizing message delivery by a plurality of message routing providers to a specified destination network;
   estimating, based on the message delivery data, for each message routing provider of the plurality of message routing providers, corresponding values of one or more parameters of a statistical distribution of message delivery outcomes by a respective message routing provider to the specified destination network; and
   determining, based on the values of the one or more parameters, an allocation of outgoing messages to message routing providers, the allocation not exceeding a specified cost ceiling of message delivery and yielding a maximum value of a chosen message delivery metric for messages originated by a message originating entity that has not provided at least part of the message delivery data.

2. The method of claim 1, further comprising:
   receiving one or more messages from the message originating entity; and
   forwarding the one or more messages to respective message routing providers based on the allocation of outgoing messages to message routing providers.

3. The method of claim 1, wherein the chosen message delivery metric reflects a likelihood of successful message delivery to the specified destination network.

4. The method of claim 1, wherein the allocation of outgoing messages to message routing providers is specified by a plurality of provider weights, such that each provider weight of the plurality of provider weights represents a share of messages to be routed by a corresponding message routing provider.

5. The method of claim 1, wherein the one or more parameters of the statistical distribution of message delivery outcomes comprise a lower end of a confidence interval of a likelihood of successful message delivery.

6. The method of claim 1, wherein the values of the one or more parameters of the statistical distribution of message delivery outcomes by the respective message routing provider do not depend upon performance of message routing providers other than the respective message routing provider.

7. The method of claim 1, further comprising:
   responsive to determining that a difference between a first number of messages successfully routed by a first message routing provider of the plurality of message routing providers in a chosen sliding window and a second number of messages successfully routed by the first message routing provider in a subsequent sliding window exceeds a defined threshold, resetting the message delivery data for the plurality of message routing providers.

8. A system, comprising:
   a memory; and
   a processing device, coupled to the memory, the processing device configured to:
   receive message delivery data characterizing message delivery by a plurality of message routing providers to a specified destination network;
   estimate, based on the message delivery data, for each message routing provider of the plurality of message routing providers, corresponding values of one or more parameters of a statistical distribution of message delivery outcomes by a respective message routing provider to the specified destination network; and
   determine, based on the values of the one or more parameters, an allocation of outgoing messages to message routing providers, the allocation not exceeding a specified cost ceiling of message delivery and yielding a maximum value of a chosen message delivery metric for messages originated by a message originating entity that has not provided at least part of the message delivery data.

9. The system of claim 8, wherein the processing device is further configured to:
   receive one or more messages from the message originating entity; and
   forward the one or more messages to respective message routing providers based on the allocation of outgoing messages to message routing providers.

10. The system of claim 8, wherein the chosen message delivery metric reflects a likelihood of successful message delivery to the specified destination network.

11. The system of claim 8, wherein the allocation of outgoing messages to message routing providers is specified by a plurality of provider weights, such that each provider weight of the plurality of provider weights represents a share of messages to be routed by a corresponding message routing provider.

12. The system of claim 8, wherein the one or more parameters of the statistical distribution of message delivery outcomes comprise a lower end of a confidence interval of a likelihood of successful message delivery.

13. The system of claim 8, wherein the values of the one or more parameters of the statistical distribution of message delivery outcomes by the respective message routing provider do not depend upon performance of message routing providers other than the respective message routing provider.

14. The system of claim 8, wherein the processing device is further configured to:
responsive to determining that a difference between a first number of messages successfully routed by a first message routing provider of the plurality of message routing providers in a chosen sliding window and a second number of messages successfully routed by the first message routing provider in a subsequent sliding window exceeds a defined threshold, reset the message delivery data for the plurality of message routing providers.

15. A non-transitory computer-readable storage medium comprising executable instructions that, responsive to execution by a processing device, cause the processing device to:
receive message delivery data characterizing message delivery by a plurality of message routing providers to a specified destination network;
estimate, based on the message delivery data, for each message routing provider of the plurality of message routing providers, corresponding values of one or more parameters of a statistical distribution of message delivery outcomes by a respective message routing provider to the specified destination network; and
determine, based on the values of the one or more parameters, an allocation of outgoing messages to message routing providers, the allocation not exceeding a specified cost ceiling of message delivery and yielding a maximum value of a chosen message delivery metric for messages originated by a message originating entity that has not provided at least part of the message delivery data.

16. The non-transitory computer-readable storage medium of claim 15, further comprising executable instructions that, responsive to execution by the processing device, cause the processing device to:
receive one or more messages from the message originating entity; and
forward the one or more messages to respective message routing providers based on the allocation of outgoing messages to message routing providers.

17. The non-transitory computer-readable storage medium of claim 15, wherein the chosen message delivery metric reflects a likelihood of successful message delivery to the specified destination network.

18. The non-transitory computer-readable storage medium of claim 15, wherein the allocation of outgoing messages to message routing providers is specified by a plurality of provider weights, such that each provider weight of the plurality of provider weights represents a share of messages to be routed by a corresponding message routing provider.

19. The non-transitory computer-readable storage medium of claim 15, wherein the one or more parameters of the statistical distribution of message delivery outcomes comprise a lower end of a confidence interval of a likelihood of successful message delivery.

20. The non-transitory computer-readable storage medium of claim 15, wherein the values of the one or more parameters of the statistical distribution of message delivery outcomes by the respective message routing provider do not depend upon performance of message routing providers other than the respective message routing provider.

* * * * *